United States Patent [19]
Frye

[11] 4,013,934
[45] Mar. 22, 1977

[54] BATTERY CHARGING CIRCUIT

[76] Inventor: George J. Frye, 12175 SW. Douglas, Portland, Oreg. 97225

[22] Filed: Nov. 7, 1975

[21] Appl. No.: 629,775

Related U.S. Application Data

[63] Continuation of Ser. No. 508,200, Sept. 23, 1974, abandoned.

[52] U.S. Cl. .................................. 320/35; 320/40; 320/48; 323/8; 323/68; 320/DIG. 1
[51] Int. Cl.² .......................................... H02J 7/04
[58] Field of Search ............... 320/2, 3, 35, 36, 39, 320/40, 48, DIG. 1; 323/8, 68, 69

[56] References Cited
UNITED STATES PATENTS

| | | | |
|---|---|---|---|
| 3,160,805 | 12/1964 | Lawson, Jr. | 320/39 |
| 3,192,405 | 6/1965 | Patchell | 323/68 X |
| 3,241,029 | 3/1966 | Slomski | 320/40 |
| 3,278,823 | 10/1966 | Ross | 320/39 X |
| 3,585,482 | 6/1971 | Zelina | 320/35 X |
| 3,825,740 | 7/1974 | Friedman et al. | 320/3 X |
| 3,919,616 | 11/1975 | Allison | 320/35 |

*Primary Examiner*—Robert J. Hickey

[57] ABSTRACT

A battery charging circuit limits the charging current to one or more series connected cells such that the cells do not receive a damaging overcharge if not removed from the circuit after the rated charging time. A first transistor shunts the battery when the voltage thereof reaches a certain level. Temperature compensation means corresponding with the change in battery voltage with temperature is provided by the base-emitter path of a second transistor connected between biasing means and the shunt transistor.

9 Claims, 3 Drawing Figures

BATTERY CHARGING CIRCUIT

CROSS REFERENCES TO RELATED APPLICATIONS

This is a continuation of application Ser. No. 508,200 filed Sept. 23, 1974, now abandoned.

BACKGROUND OF THE INVENTION

Manufacturers of rechargeable batteries give recommended charge rates and times for bringing a specified battery up to 100% of its rated capacity from a condition of zero charge. However, batteries in actual use are quite often recharged from a condition of incomplete discharge. The educated user is able to adjust the charging time for such batteries to achieve close to a 100% charge condition. More often than not, however, the user overcharges such batteries by following what he considers to be the manufacturer's recommended charging procedure.

Devices have been used, typically for automobiles, for recharging batteries in a manner that prevents a greater than 100% charge condition. These devices operate on the principle of sensing the terminal voltage of the battery, reducing the charging current when the terminal voltage exceeds a predetermined value. When this type of device is used with nickel cadmium cells or the like which have negative temperature coefficients, a condition of overcharge is often realized because of heating of the cells from the charging process and/or changes in ambient conditions. Some charging devices have been constructed which take into account the negative temperature coefficient of nickel cadmium cells or the like but are lacking a fine degree of control of the charging process.

SUMMARY OF THE INVENTION

The present invention relates to a battery charging circuit and more particularly to a charging circuit for recharging nickel cadmium cells or the like.

An object of the present invention is to provide a battery charging circuit that prevents overcharging of batteries having negative voltage-temperature coefficient.

Another object of the present invention is the provision of a battery charging circuit that has a fine degree of control over the charging process.

A further object of the present invention is to provide a battery charging circuit having means for indicating charging or noncharging conditions.

An additional object of the present invention is the provision of a battery charging circuit that utilizes a minimum number of components to achieve a fine degree of control over the charging process.

The foregong and other objects of the present invention are achieved by a battery charging circuit which comprises a regulated source of DC voltage, voltage divider means connected across the regulated source of DC voltage, temperature compensation means connected to the voltage divider means and including amplifier means for comparing the terminal voltage of the battery with that of the voltage divider means through the temperature compensation means and providing an output which controls the charging current of the battery, and current limiting means connected to the amplifier means.

These and other objects of the invention will appear more fully from the following description and accompanying drawing illustrating embodiments of the invention. It is to be understood that changes may be made from the exact details shown and described without departing from the principles of the invention.

DETAILED DESCRIPTION OF THE INVENTION

The present invention is described in conjunction with charging nickel cadmium cells, but it is to be understood that the circuit can be used to charge other cells of like characteristics.

Figure 1:
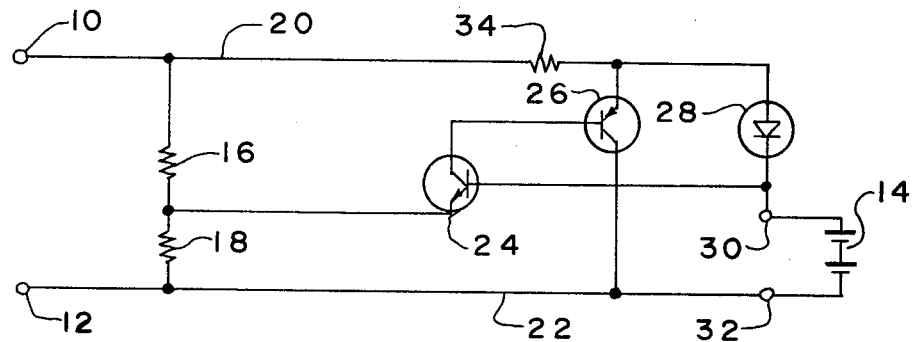
FIG. 1 is a schematic drawing of a preferred embodiment of the battery charging circuit.

Turning now to FIG. 1, terminals 10 and 12 are connected to a regulated source of DC voltage which is typically more than three times the fully-charged terminal voltage of battery 14 to be charged. Battery 14 constitutes two nickel cadmium cells connected in series. A voltage divider comprising resistors 16 and 18 is connected across leads 20 and 22 connected to terminals 10 and 12. A transistor 24 of the NPN type has its emitter connected to the junction between resistors 16 and 18, its collector is connected to the base of PNP transistor 26 while its base is connected to the cathode of limit emitting diode 28 and terminal 30.

The collector of transistor 26 is connected to lead 22 and terminal 32, while the emitter of transistor 26 is connected to the junction of the anode of diode 28 and current limiting resistor 34.

The operation of the battery charging circuit of FIG. 1 is as follows: When battery 14 has its positive and negative terminals connected to terminals 30 and 32, respectively, and it is in a condition of less than 100% charge, its terminal voltage will be less than the voltage appearing at the junction of resistors 16 and 18 plus one semiconductor junction voltage drop formed by the emitter to base voltage of transistor 24. Transistor 24 is thus rendered non-conductive which renders transitor 26 non-conducting. Current flowing to battery 14 in this condition is limited by resistor 34 in series with LED 28 which glows steadily indicating a charging condition.

When a condition of 100% charge is attained in the battery, its terminal voltage causes transistor 24 to conduct by virtue of the comparison through the base to emitter voltage of transistor 24 with the potential present at the junction of resistors 16 and 18. The conduction of transistor 24 causes transistor 26 to conduct, thus removing enough charging current from battery 14 to stabilize its terminal voltage at the desired value.

Temperature compensation of the negative temperature coefficient of battery 14 is accomplished by the temperature-sensitive emitter-base junction of transistor 24.

A relative dimming of LED 28 indicates a fully charged condition of battery 14 has been reached.

Figure 2:
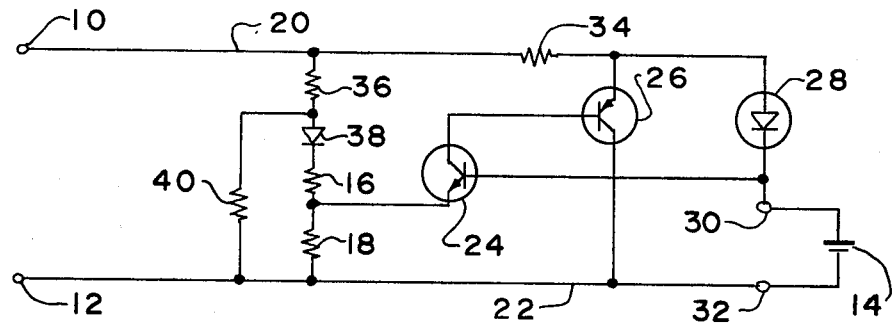
FIG. 2 is a schematic diagram of an alternative embodiment of the battery charging circuit.

FIG. 2 illustrates a battery charging circuit for charging a single nickel cadmium cell and differs from FIG. 1 only in the addition of serially connected resistor 36 and diode 38 serially connected to resistor 16 and a shunt resistor 40 connected between the junction of resistor 36 and diode 38 and lead 22. The addition of these extra components provides partial compensation for the temperature sensitive characteristic of the emitter-base junction of transistor 24 thus rendering the circuit suitable for the charging of a single nickel cadmium cell. Otherwise the operation of FIG. 2 is identical to that of FIG. 1.

In the event that three nickel cadmium cells connected in series are to be charged, an additional diode is connected between the emitter of transistor 24 and the junction of resistors 16 and 18 with its cathode connected to such junction. The operation of the additional diode circuit is identical to that of FIG. 2.

Figure 3:
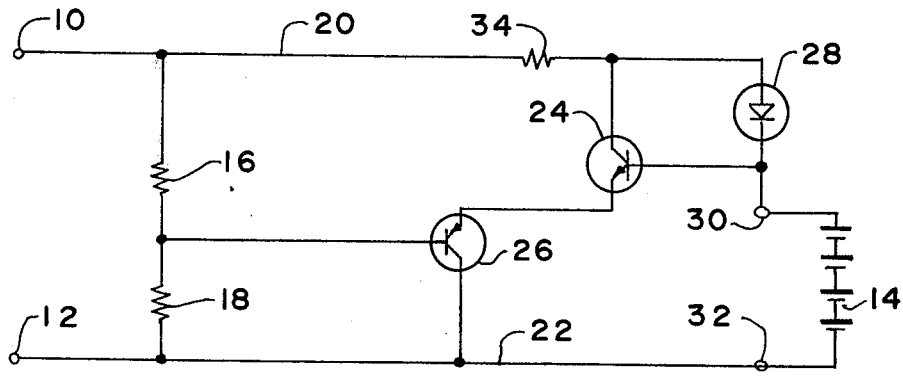
FIG. 3 is a schematic diagram of a further embodiment of the battery charging circuit.

FIG. 3 shows a circuit which is of simple form and is suitable for charging four serially-connected nickel cadmium cells. It differs from FIG. 1 by the connection of amplifier transistors 24 and 26. In this new configuration, amplifier 24 provides the connection to terminal 30 as well as the direct regulation of the charging current by connection of its collector with junction of LED 28 and current limiting resistor 34. It should be noted that the battery 14 terminal voltage is compared against the voltage present at the junction of resistors 16 and 18 through two serially-connected base-emitter junctions of transistors 24 and 26.

It is obvious that the addition of an additional diode between the emitters of transistor 24 and 26 and a network shown as in FIG. 2 will provide proper charging of six and five cell nickel cadmium batteries, respectively.

If the charging process results in a significant internal temperature rise of battery 14, then the temperature compensating means must be placed in close thermal proximity to the battery 14.

It can readily be discerned that there has been illustrated and described a battery charging circuit that results in not over-charging cells. Although the invention has been explained with reference to a particular embodiment, it is to be appreciated that various adaptations and modifications may be made without departing from the invention as defined by the appended claims.

The invention is claimed in accordance with the following:

1. A circuit for charging a battery, comprising:
   a regulated DC voltage source for providing current to charge said battery;
   amplifier means for regulating said current to said battery by diverting at least a portion of said current through a conduction path in shunt with said battery;
   biasing means connected to said amplifier means for providing a predetermined operating point, said amplifier means including at least a first transistor having its base connected to one terminal of said battery and its emitter coupled to said biasing means, said transistor being biased into conduction when the voltage across said battery reaches said predetermined operating point; and
   temperature compensation means connected between said biasing means and said conduction path for compensating for the negative temperature coefficient of said battery.

2. A circuit according to claim 1 wherein said amplifier means includes a second transistor for providing said conduction path in shunt with said battery.

3. A circuit according to claim 2 wherein said first and second transistors are of opposite conductivity types.

4. A circuit according to claim 1 wherein said temperature compensation means includes the base to emitter junction of said first transistor.

5. A circuit according to claim 1 wherein said biasing means includes voltage divider means connected to said regulated DC voltage source.

6. A circuit according to claim 5 wherein said voltage divider means includes a portion of said temperature compensation means.

7. A circuit according to claim 1 further including current limiting means connected between said regulated DC voltage source and said battery.

8. A circuit according to claim 1 further including visual indication means connected in series with said battery.

9. A circuit according to claim 8 wherein said visual indication means comprises a light emitting diode.

* * * * *